US012752638B1

(12) United States Patent
Zhao et al.

(10) Patent No.: US 12,752,638 B1
(45) Date of Patent: Oct. 6, 2026

(54) METHODS AND SYSTEM FOR WHEEL TORQUE CONTROL COORDINATION FOR ELECTRIC VEHICLE

(71) Applicant: Ford Global Technologies, LLC, Dearborn, MI (US)

(72) Inventors: Yanan Zhao, Ann Arbor, MI (US); Matthew Shelton, Grosse Ile, MI (US); Ankit Saini, Novi, MI (US); Thirumal Nagadi, Troy, MI (US); Guopeng Hu, Northville, MI (US); Zhengyu Dai, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/216,498

(22) Filed: May 22, 2025

(51) Int. Cl.

| | |
|---|---|
| ***B60K 17/356*** | (2006.01) |
| ***B60L 15/20*** | (2006.01) |
| ***F16H 61/04*** | (2006.01) |
| ***F16H 61/682*** | (2006.01) |
| *F16H 59/36* | (2006.01) |
| *F16H 59/38* | (2006.01) |
| *F16H 59/68* | (2006.01) |

(52) U.S. Cl.
CPC ........ *B60L 15/2054* (2013.01); *B60K 17/356* (2013.01); *F16H 61/0403* (2013.01); *F16H 61/682* (2013.01); *B60L 2240/421* (2013.01); *B60L 2240/423* (2013.01); *B60L 2240/463* (2013.01); *B60L 2240/486* (2013.01); *B60L 2250/26* (2013.01); *F16H 2059/366* (2013.01); *F16H 59/38* (2013.01); *F16H 2059/6807* (2013.01); *F16H 2061/0422* (2013.01); *F16H 2061/047* (2013.01)

(58) Field of Classification Search
CPC ........... B60L 2240/463; B60L 2240/50; B60L 15/2054; B60L 2240/421; B60L 2240/423; B60L 2240/486; B60L 2250/26; B60K 17/356
See application file for complete search history.

(56) References Cited

U.S. PATENT DOCUMENTS

| | | | |
|---|---|---|---|
| 7,971,667 | B2 | 7/2011 | Yamazaki |
| 8,359,144 | B2 | 1/2013 | Morris et al. |
| 8,793,057 | B2 | 7/2014 | McDonnell et al. |
| 8,954,215 | B2 | 2/2015 | Yamazaki et al. |
| 9,873,422 | B2 | 1/2018 | Yamazaki et al. |

(Continued)

FOREIGN PATENT DOCUMENTS

DE 102017125500 A1 * 5/2018 ............ B60W 20/15

OTHER PUBLICATIONS

Liu, Y. et al., "Design, Control, and Validation of Two-Speed Clutchless Automatic Transmission for Electric Vehicle," IEEE/ASME Transactions on Mechatronics, vol. 27, No. 3, Jun. 4, 2021, 11 pages.

(Continued)

*Primary Examiner* — Stacey A Fluhart
(74) *Attorney, Agent, or Firm* — McCoy Russell LLP

(57) ABSTRACT

Systems and methods for coordinating torques of two different drive systems during a gear shift are described. In one example, proactive control and compensation control are applied to reduce a magnitude of driveline torque oscillations and provide a smooth transition between speed control and torque control modes during a gear shift.

18 Claims, 6 Drawing Sheets

(56) References Cited

U.S. PATENT DOCUMENTS

| | | | | |
|---|---|---|---|---|
| 10,793,124 | B2 | 10/2020 | Zhao et al. | |
| 11,097,721 | B1 | 8/2021 | Zhao et al. | |
| 11,472,411 | B2 | 10/2022 | Hancock et al. | |
| 2015/0291154 | A1* | 10/2015 | Kaltenbach | B60W 30/182 180/65.265 |
| 2017/0137021 | A1* | 5/2017 | Nefcy | B60W 20/14 |
| 2018/0118194 | A1* | 5/2018 | Kuang | B60W 10/08 |
| 2018/0229712 | A1* | 8/2018 | Shelton | B60W 10/113 |
| 2020/0269702 | A1* | 8/2020 | Meyer | B60L 50/15 |
| 2021/0215211 | A1* | 7/2021 | Ravichandran | F16D 48/10 |
| 2022/0194195 | A1 | 6/2022 | Serrao et al. | |
| 2023/0302918 | A1 | 9/2023 | Solt et al. | |
| 2023/0339489 | A1 | 10/2023 | Roques et al. | |
| 2023/0349447 | A1 | 11/2023 | Cattoor et al. | |

OTHER PUBLICATIONS

Kim, J. et al., "Driving Control Strategy and Specification Optimization for All-Wheel-Drive Electric Vehicle System with a Two-Speed Transmission," World Electric Vehicle Journal, vol. 15, No. 10, Oct. 19, 2024, 21 pages.

* cited by examiner

METHODS AND SYSTEM FOR WHEEL TORQUE CONTROL COORDINATION FOR ELECTRIC VEHICLE

FIELD

The present description relates to methods and a system for operating an electric vehicle.

BACKGROUND

An electric vehicle may include a transmission to transfer mechanical power from an electric machine to a wheel. The transmission may be a step ratio transmission that includes two or more gear ratios. The gear ratios allow a vehicle that includes the transmission to operate efficiently over a wide range of vehicle speeds. In addition, the gear ratios allow the vehicle to meet performance metrics. However, shifting between the different gears may result in vehicle drivability issues if the gear shifting leads to driveline torque disturbances.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
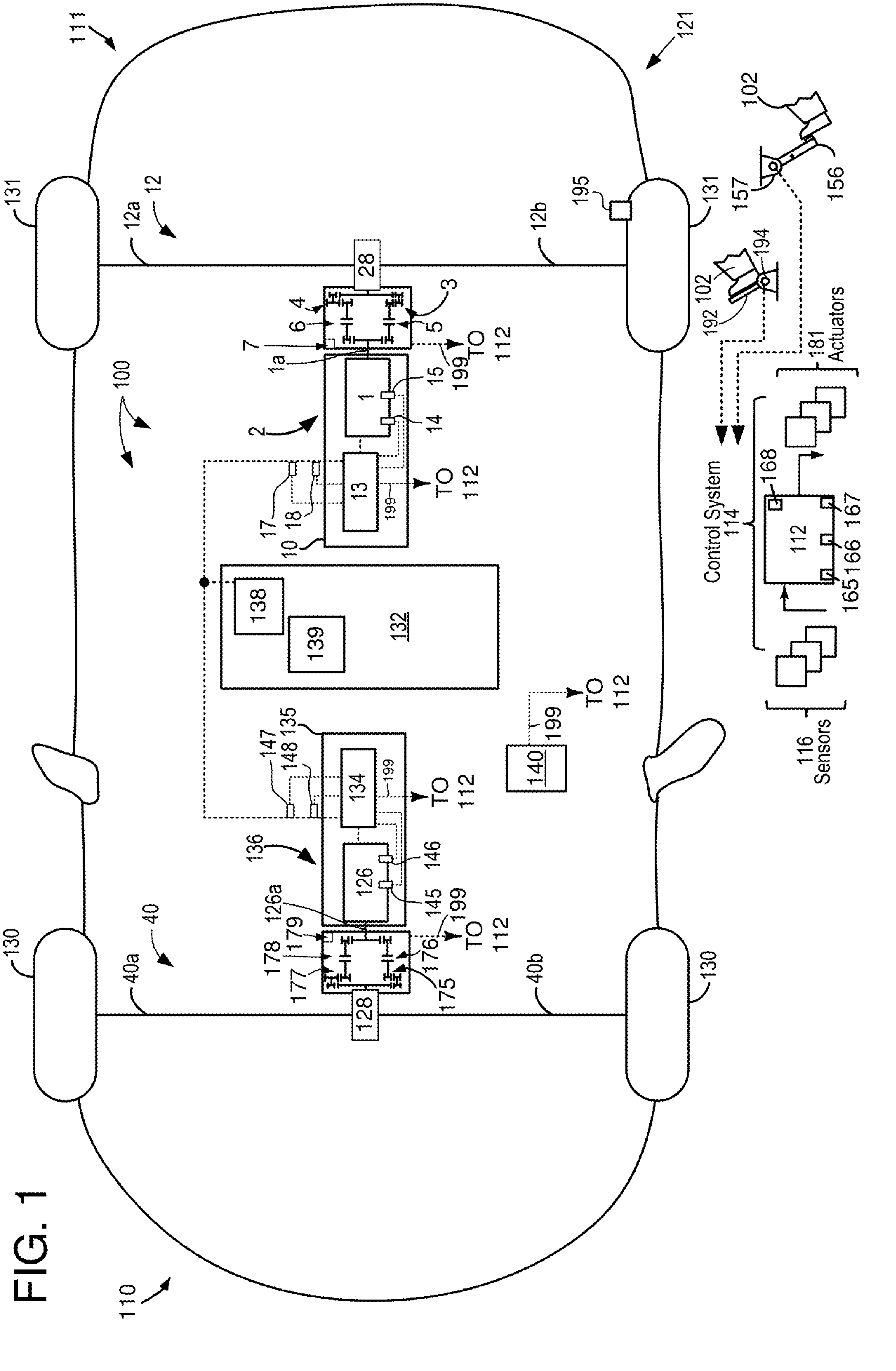
FIG. 1 is a schematic diagram of a vehicle that includes an electric machine for propulsion.
Figure 2:
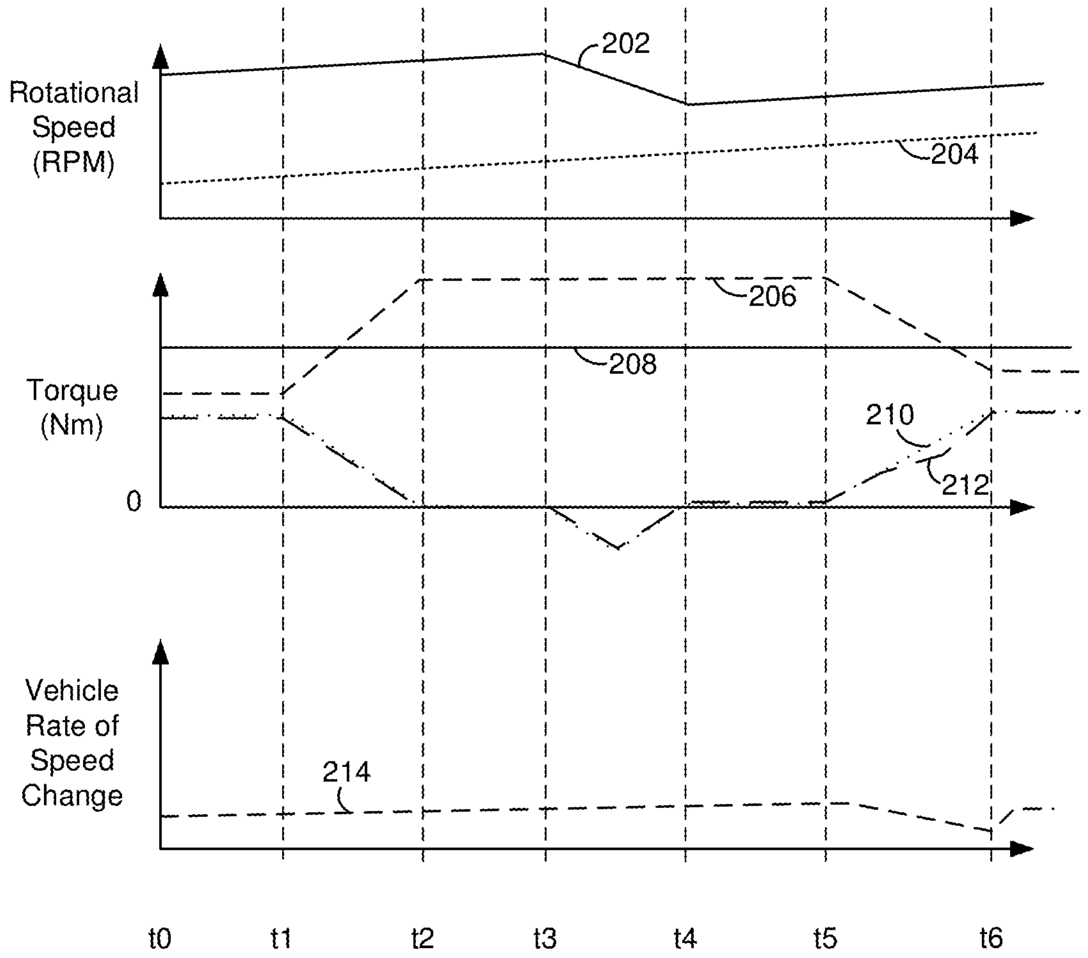
FIG. 2 is a plot that shows shifting phases of an example shifting sequence for an electric vehicle that includes a two speed step ratio transmission where the shifting sequence results in a reduction in rate of vehicle speed change.
Figure 3:
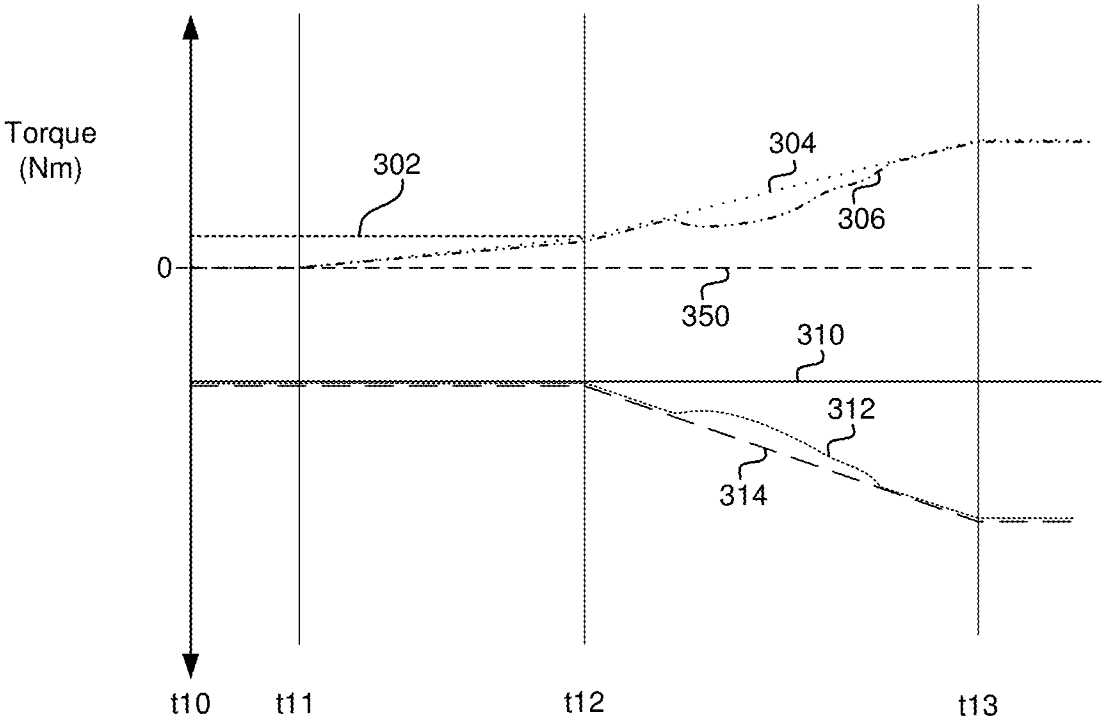
FIG. 3 is a plot showing two torque control concepts according to the present description.
Figure 4:
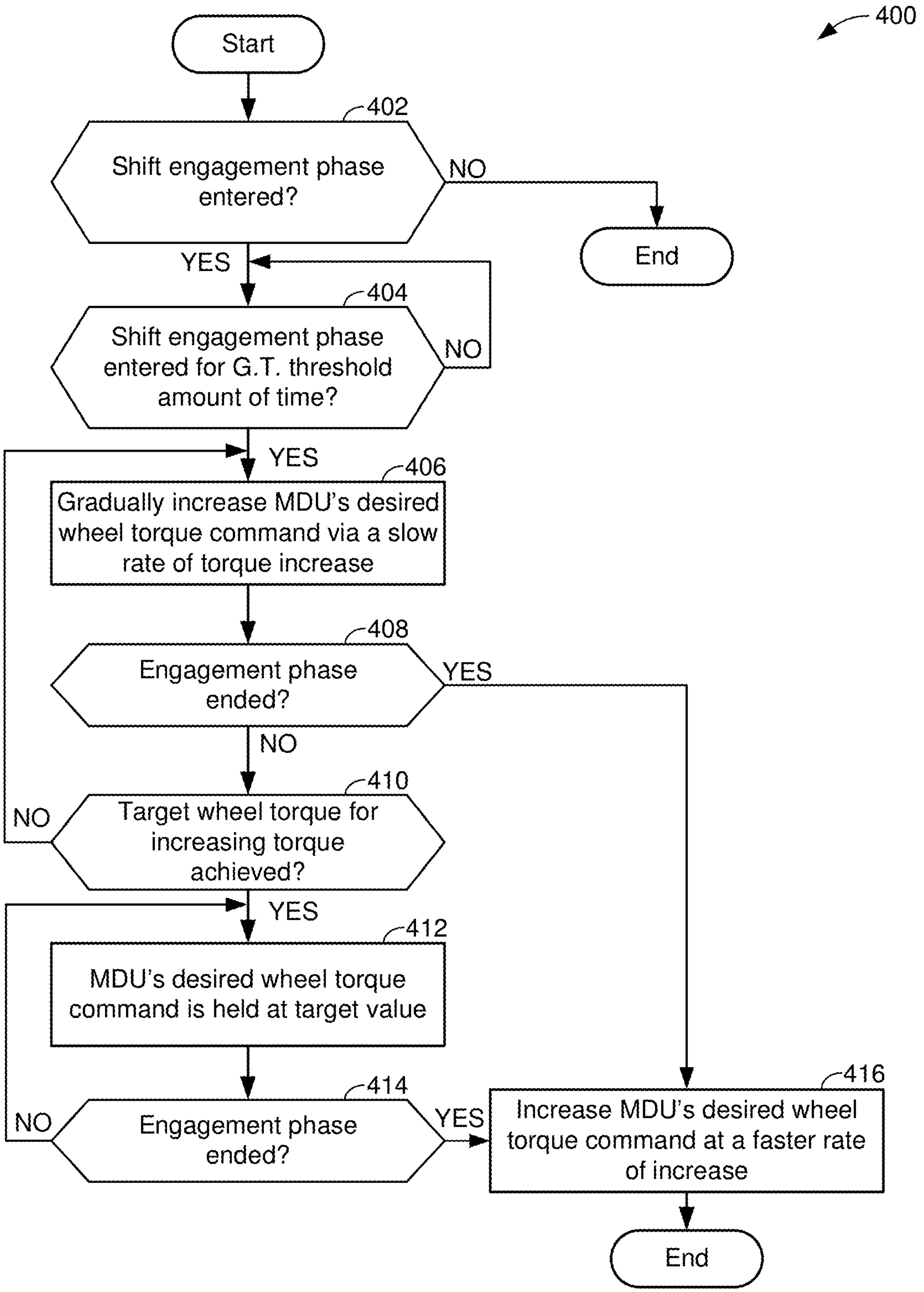
FIG. 4 is a flowchart of a method for controlling a desired main drive unit (MDU) torque.
Figure 5:
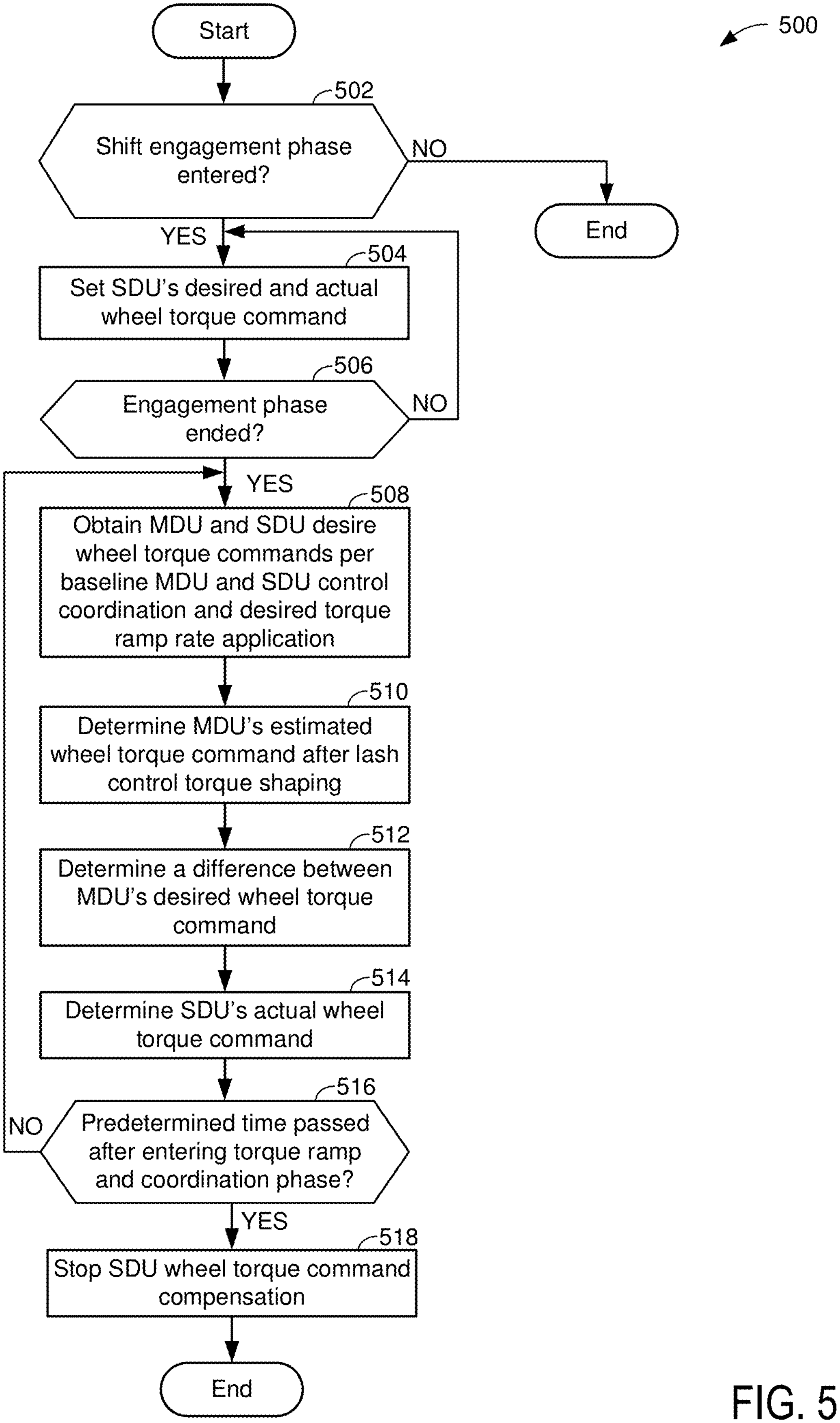
FIG. 5 is a flowchart of a method for controlling a desired secondary drive unit (SDU) torque.
Figure 6:
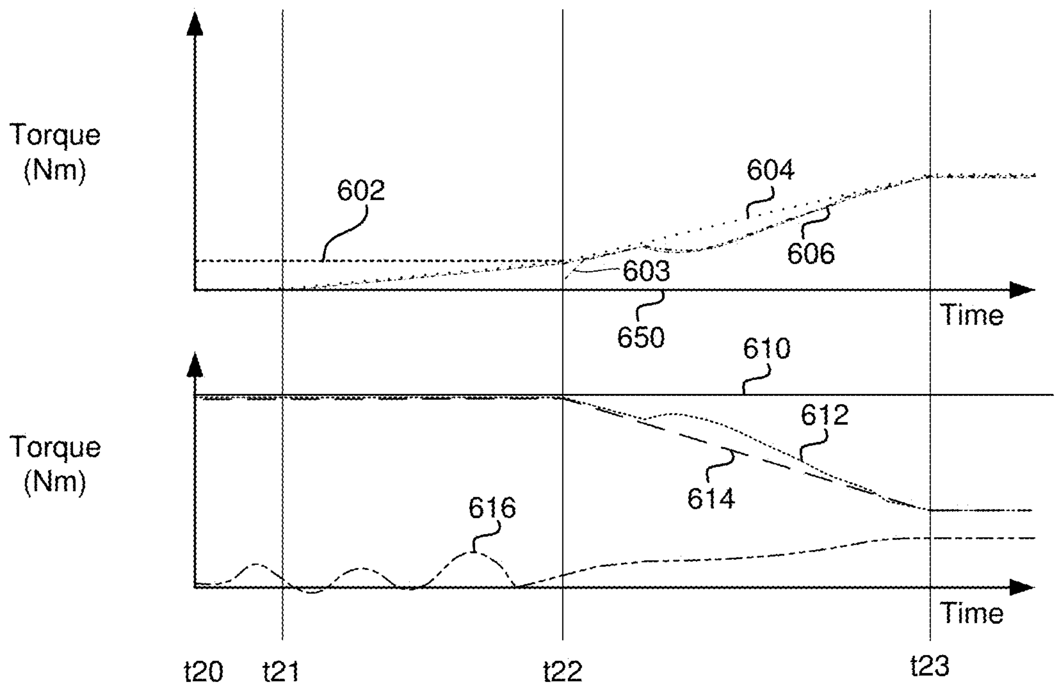
FIG. 6 is a plot that shows example signals of interest during a torque ramp up and coordination phase of a transmission gear shift.

The present description is related to increasing vehicle drivability during gear shifting of a transmission of an electric vehicle. In particular, the present description describes a gear shifting sequence for a vehicle that may include a main drive unit (MDU) and a secondary drive unit (SDU). The approach seeks to reduce a magnitude of driveline torque oscillations that may occur during a gear shift, prevent torque holes that reduce vehicle speed during the gear shift, and provide a smooth transition between speed and torque control modes during the gear shift. FIG. 1 shows an example electric vehicle. FIG. 2 shows phases of an example gear shifting sequence. FIG. 3 shows control actions to reduce magnitude of driveline torque oscillations and meet driver demand torque. A flowchart of a method for adjusting MDU operation is shown in FIG. 4. A flowchart for a method to adjust SDU operation is shown in FIG. 5. Finally, FIG. 6 shows control actions to reduce magnitude of driveline torque oscillations and meet driver demand torque.

An electric vehicle may include a step ratio transmission that includes two or more gears that may be selectively engaged. The step ratio transmission allows the electric vehicle to produce large wheel torques while operating in a first gear and achieve higher vehicle speeds while operating in a second or higher gear. However, when shifting from a first gear to a second gear, or when shifting from the second gear to the first gear, torque disturbances that affect vehicle drivability may occur. For example, the gear shift may generate a step-wise torque disturbance in the driveline and/or it may produce oscillations within the driveline. These torque disturbances may degrade vehicle drivability.

The inventors herein have recognized the above-mentioned issues and have developed a method for operating an electric drive system, comprising: supplying torque to a driveline via a main drive unit (MDU) and a secondary drive unit (SDU); and incrementally increasing a desired MDU torque to a MDU target ramp-up torque in response to a predetermined amount of time passing since most recently entering an engagement phase of a gear shift.

By incrementally increasing a desired MDU torque to a MDU target ramp-up torque in response to a predetermined amount of time passing since most recently entering an engagement phase of a gear shift, it may be possible to reduce a magnitude of torque oscillations that may occur during gear shifting so that a smoother gear shift may be provided.

The present description may provide several advantages. In particular, the approach may provide smoother gear shifts while providing shortened shifting times and meeting driver demand. Additionally, the approach may reduce a possibility of generating torque disturbances during transmission gear shifts.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not constrained to implementations that solve any disadvantages noted above or in any part of this disclosure.

FIG. 1 is a schematic diagram of a vehicle 121 including a powertrain or vehicle propulsion system 100. A front portion of vehicle 121 is indicated at 110 and a rear portion of vehicle 121 is indicated at 111. Vehicle propulsion system 100 includes electric machine 1 and electric machine 126. Electric machine 1 and electric machine 126 may consume or generate electrical power depending on its operating mode. Throughout FIG. 1, mechanical connections between various components are illustrated as solid lines, whereas electrical connections between various components are illustrated as dashed lines.

Vehicle propulsion system 100 has a rear axle 12 and a front axle 40. In some examples, rear axle 12 may comprise two half shafts, for example, a first half shaft 12*a* and second half shaft 12*b*. Similarly, front axle 40 may comprise two half shafts, for example, a first half shaft 40*a* and second half shaft 40*b*. Vehicle propulsion system 100 further has front wheels 130 and rear wheels 131. Rear wheels 131 may be driven via electric machine 1 and front wheels 130 may be driven via electric machine 126.

MDU 2 may transfer power from electric machine 1 to rear axle 12 resulting in rotation of rear wheels 131. MDU 2 may include a low gear 3 and a high gear 4 that are coupled to electric machine 1 via output shaft 1*a* of electric machine 1. Low gear 3 may be engaged via fully closing low gear clutch 5 (e.g., a dog clutch) via gear shift actuator 7. High gear 4 may be engaged via fully closing high gear clutch 6 via gear shift actuator 7. High gear clutch 6 and low gear clutch 5 may be opened and closed via commands received by MDU 2 over controller area network (CAN) 199. Alternatively, high gear clutch 6 and low gear clutch 5 may be opened and closed via digital outputs or pulse widths provided via control system 114. MDU 2 may include differential 28 so that torque may be provided to first half shaft 12*a* and to second half shaft 12*b*. In some examples, an electrically controlled differential clutch (not shown) may be included in MDU 2.

Electric machine 1 may receive electrical power from onboard electrical energy storage device 132. Furthermore, electric machine 1 may provide a generator function to convert the vehicle's kinetic energy into electrical energy, where the electrical energy may be stored at electric energy storage device 132 for later use by electric machine 1. A first inverter system controller (ISC1) 13 may convert alternating current generated by electric machine 1 to direct current for storage at the electric energy storage device 132 and vice versa. First electric drive system 10 includes electric machine 1 and first inverter system controller 13. First inverter system controller 13 may include a microcontroller, memory (e.g., random-access memory and read-exclusive memory), and input/output circuitry (not shown). Electric energy storage device 132 may be a battery, capacitor, inductor, or other electric energy storage device. Electric power flowing into first inverter system controller 13 may be monitored via current sensor 17 and voltage sensor 18. Position and speed of electric machine 1 may be monitored via position sensor 14. Torque generated by electric machine 1 may be monitored via torque sensor 15.

SDU 136 may transfer power from electric machine 126 to front axle 40 resulting in rotation of front wheels 130. SDU 136 may include a low gear 175 and a high gear 177 that are coupled to electric machine 126 via output shaft 126*a* of electric machine 126. Low gear 175 may be engaged via fully closing low gear clutch 176 (e.g., a dog clutch) via gear shift actuator 179. High gear 177 may be engaged via fully closing high gear clutch 178 via gear shift actuator 179. High gear clutch 178 and low gear clutch 176 may be opened and closed via commands received by SDU 136 over controller area network (CAN) 199. Alternatively, high gear clutch 178 and low gear clutch 176 may be opened and closed via digital outputs or pulse widths provided via control system 114. SDU 136 may include differential 128 so that torque may be provided to first half shaft 40*a* and to second half shaft 40*b*. In some examples, an electrically controlled differential clutch (not shown) may be included in SDU 136.

Electric machine 126 may receive electrical power from onboard electric energy storage device 132. Furthermore, electric machine 126 may provide a generator function to convert the vehicle's kinetic energy into electrical energy, where the electrical energy may be stored at electric energy storage device 132 for later use by electric machine 126. An inverter system controller (ISC1) 134 may convert alternating current generated by electric machine 126 to direct current for storage at the electric energy storage device 132 and vice versa. Second electric drive system 135 includes electric machine 126 and inverter system controller 134. Inverter system controller may include a microcontroller, memory (e.g., random-access memory and read-exclusive memory), and input/output circuitry (not shown). Electric power flowing into second electric drive system 135 may be monitored via current sensor 148 and voltage sensor 147. Position and speed of electric machine 126 may be monitored via position sensor 145. Torque generated by electric machine 126 may be monitored via torque sensor 146.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with electric machine 126, electric machine 1, electric energy storage device 132, inverter system controller 134, inverter system controller 13, etc. Control system 114 may receive sensory feedback information from electric drive system 135, electric drive system 10, and electric energy storage device 132, etc. Further, control system 114 may send control signals to electric drive system 135, electric drive system 10, and electric energy storage device 132, etc., responsive to this sensory feedback. Control system 114 may receive an indication of an operator requested output of the vehicle propulsion system from a human operator 102, or an autonomous controller. For example, control system 114 may receive sensory feedback from driver demand pedal position sensor 194 which communicates with driver demand pedal 192. Driver demand pedal 192 may refer schematically to a driver demand pedal. Similarly, control system 114 may receive an indication of an operator requested vehicle slowing request via a human operator 102, or an autonomous controller. For example, control system 114 may receive sensory feedback from vehicle slowing pedal position sensor 157 which communicates with vehicle slowing pedal 156.

Electric energy storage device 132 may periodically receive electrical energy from a power source such as a stationary power grid (not shown) residing external to the vehicle (e.g., not part of the vehicle). As a non-constraining example, vehicle propulsion system 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read-exclusive memory) 165, random access memory 166, digital inputs/outputs 168, and a microcontroller 167. Controller 112 may receive input data and provide data to human/machine interface 140 via CAN 199. Controller 112 may be a controller that is additional to inverter system controller 134, or alternatively, it may be a controller that is part of inverter system controller 134 and/or inverter system controller 13.

Thus, the system of FIG. 1 provides for a system, comprising: an electric drive system including a main drive unit (MDU) and a secondary drive (SDU); and a controller including executable instructions stored in non-transitory memory that cause the controller to adjust an actual SDU wheel torque in response to a difference between a desired MDU wheel torque command and an MDU wheel torque command after lash control torque shaping. In a first example, the system includes where the MDU wheel torque command after lash control torque shaping is estimated based on a gear ratio and actual MDU motor torque command. In a second example that may include the first example, the system includes where the actual SDU torque is adjusted during a SDU torque ramp-up and coordination phase of a gear shift. In a third example that may include one or both of the first example and the second example, the system further comprises additional executable instructions that cause the controller to operate the MDU in a speed control mode during an engagement phase of the gear shift. In a fourth example that may include one or more of the first through third examples, the system further comprises additional instructions that cause the controller to incrementally increasing a desired MDU wheel torque to a MDU target ramp-up wheel torque in response to a predetermined amount of time passing since most recently entering an engagement phase of the gear shift, where the engagement phase precedes the SDU torque ramp-up and coordination phase during the gear shift. In a fifth example that may include one or more of the first through fourth examples, the system further comprises additional executable instructions that cause the controller to adjusting an actual MDU wheel torque to a value based on a most recent motor torque command at an end of the engagement phase of the gear shift at a beginning of the torque ramp-up and coordination phase of the gear shift. In a sixth example that may include one or more of the first through fifth examples, the system further comprises additional executable instructions that cause the controller to adjust torque generated via the MDU and torque generated via the SDU in response to a driver demand torque, and where the adjustment ends after a threshold amount of time passes since the adjustment began, or where the adjustment ends after the desired MDU wheel torque command and the MDU wheel torque command after lash control torque shaping converge.

Referring now to FIG. 2, a gear upshifting sequence that results in a torque hole for an electric vehicle that includes a MDU and a SDU is shown. The gear upshifting sequence is for the electric vehicle and the electric vehicle includes a two-speed transmission in either of the MDU and the SDU, in this example, the MDU. The gear shifting sequence shows the different phases of the gear shift and the actual or final MDU wheel torque that includes torque compensation for taking up lash between the MDU gears so that gear shift noise and torque disturbance may be reduced. The gear shifting sequence may be performed via the vehicle that is shown in FIG. 1. Although driver demand torque in FIG. 2 is constant, the approaches described herein are applicable to increasing/decreasing positive or negative driver demands.

The first plot from the top of FIG. 2 is a plot of rotational speeds versus time. The vertical axis represents rotational speed and the horizontal axis represents time. Rotational speed increases in the direction of the vertical axis arrow and time increases from the left side of the plot to the right side of the plot. Solid line 202 represents rotational speed of the MDU's electric machine. Small dashed line 204 represents rotational vehicle wheel speed.

The second plot from the top of FIG. 2 is a plot of torque versus time. The vertical axis represents torque and the horizontal axis represents time. Torque increases in the direction of the vertical axis arrow and time increases from the left side of the plot to the right side of the plot. Solid line 208 represents total wheel torque. Dashed line 206 represents SDU torque (e.g., the amount of uncompensated torque the controller wants output by the SDU's electric machine). Dotted line 210 represents desired MDU torque (e.g., the amount of uncompensated torque the controller wants output by the MDU's electric machine) and large dash line 212 represents the actual or final MDU torque command (e.g., compensated MDU torque) that is requested from the MDU. Here, there are no additional adjustments of MDU torque that are made to the final MDU torque command. Thus, the MDU responds to the final MDU torque command.

The third plot from the top of FIG. 2 is a plot of rate of vehicle speed change versus time. The vertical axis represents rate of vehicle speed change and the rate of vehicle speed change increases in the direction of the vertical axis arrow. The horizontal axis represents time and time increases from the left side of the plot to the right side of the plot. Dashed line 214 represents the rate of vehicle speed change.

Between time t0 and time t1, represents a time period during which a gear shift is determined according to a gear shift schedule. In one example, the gear shift schedule may command gear changes in response to vehicle speed and driver demand torque. The vehicle wheel speed and MDU's electric machine speed are gradually increasing in response to the driver demand torque (not shown). The total wheel torque, desired MDU torque, final MDU torque command, and SDU torque are non-zero and constant.

Between time t1 and time t2, the gear shift sequence is in a torque swap phase where torque input to the transmission that is going to shift gears (e.g., the MDU transmission in this example) in this sequence is gradually decreased and torque that is input to the transmission that is held in gear (e.g., the SDU transmission in this example) while the other transmission shifts gears is increased so that driver demand torque is met and not exceeded by more than a threshold amount of torque. The desired MDU torque and the final MDU torque are gradually reduced while the SDU torque is gradually increased. The rotational speed of the MDU continues to increase and vehicle speed continues to increase. The total wheel torque is unchanged and the rate of change of vehicle speed remains constant. The rate of vehicle speed change is constant.

Between time t2 and time t3, the gear shift sequence is in a gear disengagement phase where the gear in the MDU that is engaged is fully disengaged at time t3. The MDU's speed continues to increase and the vehicle speed continues to increase via torque that is generated via the SDU. Torque generated by the SDU is constant and MDU generated torque is zero. The total wheel torque remains constant and the rate of vehicle speed change remains constant.

Between time t3 and time t4, the gear shift sequence is in a MDU speed synchronization phase where a rotational speed of the MDU is matched or synchronized to a rotational speed of a gear that is to be engaged during the present sequence. The desired MDU torque output and the final MDU torque are reduced, thereby causing the MDU's electric machine speed to be reduced since the MDU is not presently coupled to a wheel. The off-going clutch of the off-going gear (e.g., the gear being released, first gear in this example) is open during this time such that the MDU is decoupled from the vehicle's wheels. The MDU is operated in a speed control mode in this phase where MDU torque is adjusted so that rotational speed of the MDU matches a target or desired MDU's electric machine speed. The vehicle speed continues to increase and the SDU torque output is constant. The vehicle speed change remains constant.

Between time t4 and time t5, the gear shift sequence is in a gear engagement phase where the gear in the MDU that to be engaged is engaged. The on-coming dog clutch of the second gear of the transmission is engaged and fully closed at the end of the gear engagement phase. The MDU's electric machine speed begins to increase again at time t4 and then continues to increase. The SDU torque remains constant. The vehicle speed continues to increase via torque that is generated via the SDU. The total wheel torque remains constant and the rate of vehicle speed change remains constant. The MDU is operated in a speed control mode in this phase where MDU torque is adjusted so that rotational speed of the MDU's electric machine matches a target or desired MDU electric machine speed. The desired MDU torque and the final MDU torque are near zero.

Between time t5 and time t6, a gear shift enters its final phase, which may be referred to as a MDU torque ramp-up and coordination phase, where desired MDU torque is continuously increased without decreasing and the final MDU torque changes from a higher rate of increase to a lower rate of increase before the rate of increase is again increased. The difference between the desired MDU torque and the final MDU torque command is a torque adjustment for lash control so that lash crossing noise and driveline shuffle may be reduced as torque begins to transfer through second gear. The SDU torque is decreased while maintaining wheel torque. In this example, the final MDU torque command plus the SDU torque is less than the driver demand torque. This causes a torque hole or torque less than driver demand torque so that the vehicle rate of speed change declines. The dog clutch of the on-coming gear (e.g., the gear that is being engaged, second gear in this example) is fully closed and second gear is fully engaged during the entire final gear shift phase. The MDU speed and wheel speed continue to gradually increase. At time t6, the MDU's torque ramp-up ends and the gear shift within the MDU ends.

The torque hole and resulting decline in the rate of vehicle speed increase may reduce vehicle drivability. Therefore, it may be desirable to increase coordination between the MDU and SDU.

Turning now to FIG. 3, an engagement phase and a MDU torque ramp-up and coordination phase for a gear shift sequence for an electric vehicle is shown. In this plot, the gear shift sequence includes a proactive torque ramp for the MDU. It also includes SDU torque compensation that counters the MDU gear lash compensation torque for a gear shift. The gear upshifting sequence is for the electric vehicle and the electric vehicle includes a two-speed transmission in each of the MDU and the SDU. The gear shifting sequence may be performed via the vehicle that is shown in FIG. 1.

The plot of FIG. 3 is a plot showing torque versus time. The vertical axis represents torque and the horizontal axis represents time. Torque increases in the direction of the vertical axis arrow and time increases from the left side of the plot to the right side of the plot. Dashed line 302 represents a MDU ramp-up target torque level (e.g., a threshold level that MDU is gradually increased to during the engagement phase of the gear shift). Dotted line 304 represents desired MDU wheel torque. Dash-dot-dot line 306 represents the final MDU wheel torque command. Dashed line 350 indicates the level of zero torque. Solid line 310 represents the driver demand wheel torque. Large dashed line 314 represents desired SDU wheel torque. Small dashed line 312 represents an actual or final SDU wheel torque command.

At time t10, the engagement phase of the gear shift sequence begins and the desired MDU wheel torque and the final MDU wheel torque are zero. This allows the dog clutch of the on-coming gear to engage, such that teeth of one side of the dog clutch may mesh with teeth of the other side of the dog clutch. The desired MDU wheel torque and the final MDU wheel torque command values are equivalent. The MDU ramp-up torque level is greater than zero torque. The desired SDU wheel torque and the actual or final SDU wheel torque equal the total driver demand wheel torque.

At time t11, the final MDU wheel torque command begins to ramp or incrementally increase toward the MDU ramp-up torque level. Here, the sign of the MDU ramp-up torque level is selected to be the same as the sign of total driver demand wheel torque. The magnitude of the MDU ramp-up torque level is calibratable, e.g., ±50 Newton-meters, where if the wheel torque command stays above the calibratable value lash crossing through gear can be reduced. The MDU torque command is incrementally increased in value at a first rate (e.g., a slower rate). This action is taken to reduce torque command oscillation and hesitation during the torque ramp-up phase of the gear shift. Thus, the control action may reduce a possibility of the MDU wheel torque command moving from positive to zero and then increasing above zero again during the MDU torque ramp-up phase. Further, the action may reduce an amount of time it takes to reduce gear lash in the MDU (e.g., the amount of time it takes to remove space between gears of the MDU). Reducing the amount of time it takes to reduce gear lash may allow the MDU to output larger torque amounts sooner in the MDU torque ramp-up phase while reducing gear noise and driveline torque disturbances that may be the result of gear lash (e.g., mechanical space or clearance between gear teeth). The amount of time between t10 and t11 may be predetermined and it may be based on but not constrained to gear shift actuator performance and the amount of time taken for clutch engagement. For example, if the gear shift actuator may move to the engaged position in 100 milliseconds, then the predetermined amount of time may be 30 milliseconds to ensure that there is enough time for 304 (desired MDU wheel torque) to reach 302 (MDU ramp-up target torque level). The engagement phase ends at time t12 and the MDU torque ramp-up and coordination phase for the gear shift sequence begins.

Between time t12 and time t13, the desired MDU wheel torque is gradually increased at a second rate, the second rate greater than the first rate. Increasing the desired MDU wheel torque allows the MDU to provide a portion of the driver demand wheel torque that is being requested. The final MDU wheel torque tracks with the desired MDU wheel torque until a time beginning at about one quarter of the time through the MDU torque ramp-up and coordination phase, then the final MDU wheel torque diverges away from the desired MDU wheel torque. In particular, the final MDU wheel torque is reduced so that the MDU reduces a rate at which gear teeth in the MDU come together so that gear noise may be reduced. While the desired MDU torque is increasing, the desired SDU torque is decreasing at a rate that is similar to the rate that the MDU is increasing, but with an opposite sign. This allows the MDU and SDU to meet the driver demand torque. Additionally, the final SDU torque tracks with the desired SDU torque until the time beginning at about one quarter of the time through the SDU ramp-up phase, then the final SDU wheel torque diverges away from the desired SDU wheel torque. In particular, the final SDU wheel torque is increased so that the SDU compensates or makes up for the amount of torque that the final MDU torque is reduced from the desired MDU wheel torque. This allows the MDU and SDU to meet the driver demand torque when gear lash is being reduced during the MDU torque ramp-up and coordination phase. Thus, a possibility of a torque hole and driveline torque disturbance in the driveline may be reduced in this way. The MDU torque ramp-up and coordination phase ends at time t13.

Note that during the engagement phase of the gear shift the MDU is under speed control and it is decoupled from vehicle wheels. The control action for the MDU's desired wheel torque command is a preparation. The MDU's desired wheel torque has no effect on the MDU's operation and driveline behavior during the engagement phase of the gear shift. However, it does define the desired magnitude and sign of the MDU wheel torque command at the entry time of the MDU torque ramp-up and coordination phase of the gear shift. It may affect the lash control behavior and torque profile of the final MDU torque.

Moving on to FIG. 4, a flowchart of a method for controlling a MDU during a gear shift of a transmission is shown. The method of FIG. 4 may be at least partially implemented as executable instructions stored in memory of one or more controllers in the systems of FIG. 1. Further, the method of FIG. 4 may include actions taken in the physical world to transform operating states of the system of FIG. 1. In addition, in some examples, the method of FIG. 4 may be distributed amongst several controllers where each controller performs a portion of the method. The MDU and SDU may be supplying torque to a vehicle's driveline immediately before the gear shift during which the method of FIG. 4 is executed. Further, the phases of a gear shift that are shown in FIG. 3 before the engagement phase may precede the execution of the method of FIG. 4.

At 402, method 400 judges whether or not the MDU is in an engagement phase of a gear shift. The engagement phase may start when a rotational speed of the MDU's electric machine is within a threshold speed of a rotational speed of an on-coming gear (e.g., the gear that is about to be engaged). If method 400 judges that the MDU is entering an engagement phase of a gear shift, the answer is yes and method 400 proceeds to 404. Otherwise, the answer is no and method 400 proceeds to exit.

At 404, method 400 judges whether or not the gear engagement phase of the present gear shift has been entered for longer than a predetermined amount of time. If so, the answer is yes and method 400 proceeds to 406. Otherwise, the answer is no and method 400 returns to 404.

At 406, method 400 gradually increases the MDU torque at a first rate of torque increase toward a MDU ramp-up target torque level (e.g., 302 of FIG. 3). The first rate of torque increase may be based on a desired duration for the engagement phase of the gear shift and the difference between the present MDU torque and the MDU ramp-up target torque level. Method 400 proceeds to 408.

At 408, method 400 judges whether or not the engagement phase of the gear shift is ended. The engagement phase of the gear shift may be ended a predetermined amount of time after the engagement phase was entered or when the gear shift actuator position sensor indicates that the on-coming gear is fully engaged. If method 400 judges that the engagement phase is ended, the answer is yes and method 400 proceeds to 416. Otherwise, the answer is no and method 400 proceeds to 410.

At 410, method 400 judges whether or not the MDU torque has achieved or reached the MDU ramp-up target torque level. If so, the answer is yes and method 400 proceeds to 412. Otherwise, the answer is no and method 400 returns to 406.

At 412, method 400 holds the MDU desired torque command (e.g., a wheel torque) at the MDU ramp-up target torque level. Method 400 proceeds to 414.

At 414, method 400 judges whether or not the engagement phase of the gear shift is ended. The engagement phase of the gear shift may be ended a predetermined amount of time after the engagement phase was entered or when the gear shift actuator position sensor indicates that the on-coming gear is fully engaged. If method 400 judges that the engagement phase is ended, the answer is yes and method 400 proceeds to 416. Otherwise, the answer is no and method 400 returns to 412.

At 416, method 400 increases the MDU's desired torque command at a second rate, the second rate greater than the first rate as shown in FIG. 3. This finalizes the engagement phase of the gear shift for the MDU and method 400 proceeds to exit.

Moving on to FIG. 5, a flowchart of a method for controlling a SDU during a gear shift of a transmission is shown. The method of FIG. 5 may be at least partially implemented as executable instructions stored in memory of one or more controllers in the systems of FIG. 1. Further, the method of FIG. 5 may include actions taken in the physical world to transform operating states of the system of FIG. 1. In addition, in some examples, the method of FIG. 5 may be distributed amongst several controllers where each controller performs a portion of the method. The MDU and SDU may be supplying torque to a vehicle's driveline immediately before the gear shift during which the method of FIG. 5 is executed. Further, the phases of a gear shift that are shown in FIG. 3 before the engagement phase may precede the execution of the method of FIG. 5.

At 502, method 500 judges whether or not the MDU is in an engagement phase of a gear shift. The engagement phase may start when a rotational speed of the MDU's electric machine is within a threshold speed of a rotational speed of an on-coming gear (e.g., the gear that is about to be engaged). If method 500 judges that the MDU is entering an engagement phase of a gear shift, the answer is yes and method 500 proceeds to 504. Otherwise, the answer is no and method 500 proceeds to exit.

At 504, method 500 sets the SDU's desired torque and the actual SDU torque command to their respective values. In one example, method may set the SDU's desired torque and actual SDU torque command to the total desired driver demand torque. This allows the vehicle to meet driver demand torque while the MDU is in its engagement phase of the gear shift. The desired SDU and actual SDU torques may be determined via the following equation:

$$WhlTqCmd\_SDUDes = WhlTqCmd\_SDUAct = \min(WhlTqCmd\_dd, WhlTqCmd\_SMDMax)$$

where WhlTqCmd_SDUDes is the desired SDU torque command, WhlTqCmd_SDUAct is the actual or final SDU torque command, min is a function that returns a minimum value of two arguments, WhlTqCmd_dd is driver demand torque, and WhlTqCmd_SDUMax is a maximum SDU torque capability mapped to wheel torque domain. Method 500 proceeds to 506.

At 506, method 500 judges whether or not the engagement phase of the gear shift is ended. The engagement phase of the gear shift may be ended a predetermined amount of time after the engagement phase was entered or when the gear shift actuator position sensor indicates that the oncoming gear is fully engaged. If method 500 judges that the engagement phase is ended, the answer is yes and method 500 proceeds to 508. Otherwise, the answer is no and method 500 returns to 504.

At 508, method 500 enters the SDU torque ramp-up and coordination phase of the gear shift. Method 500 adjusts the MDU and SDU torque commands according to baseline MDU and SDU torque control coordination and a desired MDU ramp torque rate. In particular, the desired MDU torque has been adjusted to the MDU ramp-up target torque prior to entering the torque ramp-up and coordination phase of the gear shift, so the SDU torque is adjusted so that desired MDU torque plus desired SDU torque equals driver demand torque. The MDU torque and the SDU torque may be predetermined fractional amounts of the driver demand torque. The MDU torque may also be adjusted according to the MDU torque ramp rate. Method 500 may determine the MDU torque ramp rate (e.g., a predetermined rate of incremental increase of the MDU torque) via referencing a table or function that is based on a shift urgency level). Method 500 begins increasing the desired MDU torque at the MDU torque ramp rate and the desired SDU torque is reduced according to the desired MDU torque ramp rate so that desired MDU torque plus desired SDU torque equals driver demand torque. Method 500 proceeds to 510.

Additionally, in some examples, method 500 may also at a beginning of a torque ramp-up and coordination phase of the gear shift, adjust an actual MDU wheel torque to a value based on a most recent motor torque command at an end of the engagement phase of the gear shift. For example, if MDU wheel torque at the last moment of the engagement phase of a gear shift is 50 Newton meters (Nm), method 500 may adjust the MDU wheel torque at the beginning of the ramp-up and coordination phase to 50 Nm.

At 510, method 500 estimates the MDU's wheel torque command after lash control torque shaping. In one example, the MDU gear lash compensation reduces the rate that MDU torque increases as shown in FIG. 3 so that noise of gears coming together may be reduced as shown in FIG. 5. The MDU gear lash compensation torque may be empirically determined and it may be stored in a table or function in controller memory. For example, based on different lash crossing control stages, the gear lash compensation torque can be a rate-limited torque of the desired wheel torque command, or it may be calculated as the output of a feedback controller to minimize lash crossing clunk. For the SDU wheel torque control adjustment, this MDU wheel torque after gear lash compensation may be estimated from the actual MDU's motor torque command itself via the following equation:

$$\text{Whl\_TqCmdMDUShapingEst} = \text{MtrTqCmd\_MDU} * \text{GearRatio}$$

where Whl_TqCmdMDUShapingEst is the estimated MDU wheel torque after gear lash compensation torque, MtrTqCmd_MDU is the MDU's actual motor torque command, and GearRatio is the gear ratio of the MDU at the present engaged gear. Method 500 proceeds to 512 after the MDU torque command after lash control torque compensation is determined.

At 512, method 500 determines a difference between the MDU's desired wheel torque command and the MDU's wheel torque command after lash control torque shaping via the following equation:

$$\text{WhlTqCmd\_MDUDiff} = \text{WhlTqCmd\_MDUDes} - \text{WhlTqCmd\_MDUShapingEst}$$

where WhlTqCmd_MDUDiff, is the difference between the MDU's desired wheel torque command and the MDU's wheel torque command after lash control torque shaping, WhlTqCmd_MDUDes is the desired MDU torque command, and WhlTqCmd_MDUShapingEst is the estimated MDU's wheel torque command after lash control torque shaping. Method 500 proceeds to 514 after the difference between the MDU's desired wheel torque command and the MDU's wheel torque command after lash control torque shaping is determined.

At 514, method 500 determines the actual or final SDU wheel torque command. In one example, method 500 determines the actual or final SDU wheel torque command via the following equation:

$$\text{WhlTqCmd\_SDUAct} = \text{WhlTqCmd\_SDUDes} + \text{WhlTqcmd\_MDUDiff}$$

where WhlTqCmd_SDUAct is the actual or final SDU wheel torque command, WhlTqCmd_SDUDes is the desired SDU wheel torque command, and WhlTqcmd_MDUDiff is the difference between the MDU's desired wheel torque command and the MDU's wheel torque command after lash control torque shaping. Method 500 proceeds to 516.

At 516, method 500 judges whether or not a threshold amount of time has passed since most recently entering the torque ramp-up and coordination phase of the present gear shift or if the difference between the actual SDU wheel torque command value and the desired SDU wheel torque without regard to the sign of the difference is less than a threshold value. If so, the answer is yes and method 500 proceeds to 518. Otherwise, the answer is no and method 500 returns to 508. In one example, the decision at 516 may be based on the following equation:

$$T >= \text{threshold OR } \text{abs}(\text{WhlTqCmd\_SDUAct} - \text{WhlTqCmd\_SDUDes}) < \text{threshold2}$$

where T is an amount of time that has passed since most recently entering the torque ramp-up and coordination phase of the present gear shift, threshold is a predetermined amount of time, threshold2 is a second predetermined amount of torque, and WhlTqCmd_SDUAct and WhlTqCmd_SDUDes are as previously described.

At 518, method 500 stops or ceases to compensate SDU torque during the present gear shift. Thus, the SDU may not be adjusted according to the difference between the MDU's desired wheel torque command and the MDU's wheel torque command after lash control torque shaping. Method 500 proceeds to exit.

In this way, the SDU torque may be commanded based on MDU torque compensation so that driver demand torque may be met. For example, if MDU torque is reduced when MDU torque is scheduled to increase at a second predetermined rate, SDU torque may be increased so that driver demand torque may be met but not exceeded.

The methods of FIGS. 4 and 5 provide for a method for operating an electric drive system, comprising: supplying torque to a driveline via a main drive unit (MDU) and a secondary drive unit (SDU); and incrementally increasing a desired MDU wheel torque to a MDU target ramp-up wheel torque in response to a predetermined amount of time passing since most recently entering an engagement phase of a gear shift. In a first example, the method includes where the predetermined amount of time is based on operation of a gear shift actuator and where a sign of the MDU target ramp-up wheel torque remains equal to a driver demand wheel torque. In a second example that may include the first example, the method further comprises: at a beginning of a torque ramp-up and coordination phase of the gear shift, adjusting an actual MDU wheel torque to a value based on a most recent motor torque command at an end of the engagement phase of the gear shift. In a third example that may include one or both of the first and second examples, the method includes where the engagement phase of the gear shift begins when a rotational speed of an electric machine is within a threshold rotational speed of an on-coming gear of the MDU and where a magnitude of the MDU target ramp-up wheel torque is adjusted to prevent lash crossing entry if a wheel torque command remains above the MDU target ramp-up wheel torque. In a fourth example that may include one or more of the first through third examples, the method includes where the incrementally increasing the desired MDU wheel torque includes increasing the desired MDU wheel torque at a predetermined rate. In a fifth example that may include one or more of the first through fourth examples, the method includes where an electric machine of the MDU is decoupled from a wheel of a vehicle during the engagement phase of the gear shift. In a sixth example that may include one or more of the first through fifth examples, the method of claim 1, where the engagement phase of the gear shift is immediately preceded by a MDU speed synchronization phase, and where during the engagement phase a desired SDU wheel torque does not change as the MDU's desired wheel torque increases. In a seventh example that may include one or more of the first through sixth examples, the method includes where an electric machine of the MDU is in a speed control mode during the engagement phase of the gear shift, and where during the engagement phase a desired SDU wheel torque is the lesser of a desired wheel torque command and a maximum SDU wheel torque command.

The methods of FIGS. 4 and 5 provide for a method for operating an electric drive system, comprising: supplying torque to a driveline via a main drive unit (MDU) and a secondary drive unit (SDU); and adjusting an actual SDU wheel torque in response to a difference between a desired MDU wheel torque command and an MDU wheel torque command after lash control torque shaping. In a first example, the method further comprises adjusting the actual SDU torque according to a driver demand torque. In a second example that may include the first example, the method includes where the MDU wheel torque command after lash control torque shaping is estimated based on a gear ratio and actual MDU motor torque command. In a third example that may include one or both of the first and second examples, the method includes where the actual SDU wheel torque is adjusted during a torque ramp-up and coordination phase of a gear shift. In a fourth example that may include one or more of the first through third examples, the method includes where the actual SDU wheel torque is determined via adding the difference between the desired MDU wheel torque command and the MDU wheel torque command after lash control torque shaping with a desired SDU wheel torque command.

Referring now to FIG. 6, an engagement phase and a MDU torque ramp-up and coordination phase for a gear shift sequence for an electric vehicle is shown. In these plots, the gear shift sequence includes a proactive torque ramp for the MDU. It also includes SDU torque compensation that counters the MDU gear lash compensation torque and resetting of the MDU actual wheel torque command during a gear shift sequence. The gear upshifting sequence is for the electric vehicle and the electric vehicle includes a two-speed transmission in each of the MDU and the SDU. The gear shifting sequence may be performed via the vehicle that is shown in FIG. 1. The plots are aligned in time.

The first plot from the top of FIG. 6 is a plot showing torque versus time. The vertical axis represents torque and the horizontal axis represents time. Torque increases in the direction of the vertical axis arrow and time increases from the left side of the plot to the right side of the plot. Dashed line 602 represents a MDU ramp-up target torque level (e.g., a threshold level that MDU is gradually increased to during the engagement phase of the gear shift. Dash-dot line 603 represents MDU actual or final MDU wheel torque command with reset. Dotted line 604 represents desired MDU wheel torque. Dash-dot-dot line 606 represents the final MDU wheel torque command. The wheel torque is zero at the level of the horizontal axis.

The second plot from the top of FIG. 6 is a plot showing torque versus time. The vertical axis represents torque and the horizontal axis represents time. Torque increases in the direction of the vertical axis arrow and time increases from the left side of the plot to the right side of the plot. Solid line 610 represents the total driver demand wheel torque. Large dashed line 614 represents desired SDU wheel torque. Small dashed line 612 represents a final SDU wheel torque command. Large dash-small dash-small dash line 616 represents the MDU actual motor torque command.

At time t20, the desired MDU wheel torque, the final MDU wheel torque, and final MDU wheel torque with reset are zero. Between times t20 and t22, the MDU is operated in speed control mode and it is not coupled to the vehicle's wheels. Therefore, the MDU's torque command is an amount to converge MDU rotational speed to a desired or requested MDU speed.

At time t21, the final MDU wheel torque command and the final MDU wheel torque command with reset begin to ramp or incrementally increase toward the MDU ramp-up torque level for later phase (torque ramp-up phase of the gear shift) control preparation. As MCU is decoupled from the driveline, there is zero wheel torque delivered from MCU to the wheels. The final MDU wheel torque command and final MDU wheel torque command with reset are incrementally increased at a first rate (e.g., a slower rate). This action is taken to reduce torque command oscillation and hesitation during the torque ramp-up phase of the gear shift. Thus, the control action may reduce a possibility of the MDU wheel torque command moving from positive to zero and then increasing above zero again during the MDU torque ramp-up phase. Further, the action may reduce an amount of time it takes to reduce gear lash in the MDU (e.g., the amount of time it takes to remove space between gears of the MDU). Reducing the amount of time it takes to reduce gear lash may allow the MDU to output larger torque amounts sooner in the MDU torque ramp-up phase while reducing gear noise and driveline torque disturbances that may be the result of gear lash (e.g., mechanical space or clearance between gear teeth). The amount of time between t20 and t21 may be predetermined and it may be based on but not constrained to gear shift actuator performance. The total driver demand wheel torque is non-zero and the SDU desired wheel torque and the SDU actual wheel torque equal the total driver demand wheel torque.

Between time t22 and time t23, the desired MDU wheel torque is gradually increased at a second rate, the second rate greater than the first rate. Increasing the desired MDU wheel torque allows the MDU to provide a portion of the driver demand torque that is being requested. The final MDU wheel torque tracks with the desired MDU wheel torque until a time beginning at about one quarter of the time through the MDU torque ramp-up and coordination phase, then the final MDU wheel torque diverges away from the desired MDU wheel torque. In particular, the final MDU wheel torque is reduced so that the MDU reduces a rate at which gear teeth in the MDU come together so that gear noise may be reduced. While the desired MDU wheel torque is increasing, the desired SDU wheel torque is decreasing at a rate that is similar to the rate that the desired MDU wheel torque is increasing, but with an opposite sign. This allows the MDU and SDU to meet the driver demand torque. On the other hand, at t22, the final MDU wheel torque with reset jumps to a lower torque value, which is the actual motor torque (616) at t22 converted to the wheel torque using present gear ratio. This action ensures a smoother motor torque command transition as the motor changes from speed control mode to torque control mode. Additionally, the final SDU wheel torque tracks with the desired SDU wheel torque until the time beginning at about one quarter of the time through the SDU ramp-up phase, then the final SDU wheel torque diverges away from the desired SDU wheel torque. In particular, the final SDU wheel torque is increased so that the SDU compensates or makes up for the amount of torque that the final MDU wheel torque is reduced from the desired MDU wheel torque. This allows the MDU and SDU to meet the driver demand torque when gear lash is being reduced during the MDU torque ramp-up and coordination phase. Thus, a possibility of a torque hole and driveline torque disturbance in the driveline may be reduced in this way. The MDU torque ramp-up and coordination phase ends at time t23.

Note that during the engagement phase of the gear shift the MDU is under speed control and it is decoupled from vehicle wheels. The control action for the MDU's desired wheel torque command is a preparation. The MDU's desired wheel torque has no effect on the MDU's operation and driveline behavior during the engagement phase of the gear shift. However, it does define the desired magnitude and sign of the MDU wheel torque command at the entry time of the MDU torque ramp-up and coordination phase of the gear shift. It may affect the lash control behavior and torque profile of the final MDU torque.

Note that the example control and estimation routines included herein can be used with various electric vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description.

The invention claimed is:

1. A method for operating an electric drive system, comprising:

supplying torque to a driveline via a main drive unit (MDU) and a secondary drive unit (SDU); and incrementally increasing a desired MDU wheel torque to a MDU target ramp-up wheel torque in response to an amount of time passing since most recently entering an engagement phase of a gear shift, where incrementally increasing the desired MDU wheel torque includes increasing the desired MDU wheel torque at a predetermined rate.

2. The method of claim 1, where the amount of time is based on operation of a gear shift actuator, and where a sign of the MDU target ramp-up wheel torque is the same as a sign of a driver demand wheel torque.

3. The method of claim 1, further comprising:

at a beginning of a torque ramp-up and coordination phase of the gear shift, adjusting an actual MDU wheel torque to a value based on a most recent motor torque command at an end of the engagement phase of the gear shift.

4. The method of claim 1, where the engagement phase of the gear shift begins when a rotational speed of an electric machine is within a threshold rotational speed of an oncoming gear of the MDU, and where a magnitude of the MDU target ramp-up wheel torque is adjusted to prevent lash crossing entry if a wheel torque command is sustained above the MDU target ramp-up wheel torque.

5. The method of claim 1, where an electric machine of the MDU is decoupled from a wheel of a vehicle during the engagement phase of the gear shift.

6. The method of claim 1, where the engagement phase of the gear shift is immediately preceded by a MDU speed synchronization phase, and where during the engagement phase a desired SDU wheel torque does not change as the MDU's desired wheel torque increases.

7. The method of claim 1, where an electric machine of the MDU is in a speed control mode during the engagement phase of the gear shift, and where during the engagement phase a desired SDU wheel torque is the lesser of a desired wheel torque command and a maximum SDU wheel torque capability.

8. A system, comprising:

an electric drive system including a main drive unit (MDU) and a secondary drive (SDU); and a controller including executable instructions stored in non-transitory memory that cause the controller to:

adjust an actual SDU wheel torque in response to a difference between a desired MDU wheel torque command and an MDU wheel torque command after lash control torque shaping, where the lash control torque shaping comprises rate-limiting an increase of the MDU wheel torque command to reduce gear noise during a gear shift, and incrementally increase the desired MDU wheel torque to a MDU target ramp-up wheel torque at a predetermined rate in response to an amount of time passing since most recently entering an engagement phase of a gear shift.

9. The system of claim 8, where the MDU wheel torque command after lash control torque shaping is estimated based on a gear ratio and actual MDU motor torque command.

10. The system of claim 9, where the actual SDU torque is adjusted during a SDU torque ramp-up and coordination phase of a gear shift.

11. The system of claim 10, further comprising additional executable instructions that cause the controller to operate the MDU in a speed control mode during an engagement phase of the gear shift.

12. The system of claim 10, where the engagement phase precedes the torque ramp-up and coordination phase during the gear shift.

13. The system of claim 12, further comprising additional executable instructions that cause the controller to adjust an actual MDU wheel torque to a value based on a most recent motor torque command at an end of the engagement phase of the gear shift at a beginning of the torque ramp-up and coordination phase of the gear shift.

14. The system of claim 8, further comprising additional executable instructions that cause the controller to adjust torque generated via the MDU and torque generated via the SDU in response to a driver demand torque, and where the adjustment of the actual SDU wheel torque ends after a threshold amount of time passes since the adjustment began, or where the adjustment of the actual SDU wheel torque ends after the desired MDU wheel torque command and the MDU wheel torque command after lash control torque shaping converge.

15. A method for operating an electric drive system, comprising:

supplying torque to a driveline via a main drive unit (MDU) and a secondary drive unit (SDU); and adjusting an actual SDU wheel torque in response to a difference between a desired MDU wheel torque command and an MDU wheel torque command after lash control torque shaping, where the lash control torque shaping comprises rate-limiting an increase of the MDU wheel torque command to reduce gear noise during a gear shift, and where the actual SDU wheel torque is determined via adding the difference between the desired MDU wheel torque command and the MDU wheel torque command after lash control torque shaping with a desired SDU wheel torque command.

16. The method of claim 15, further comprising adjusting the actual SDU torque according to a driver demand torque.

17. The method of claim 16, where the MDU wheel torque command after lash control torque shaping is estimated based on a gear ratio and actual MDU motor torque command.

18. The method of claim 15, where the actual SDU wheel torque is adjusted during a torque ramp-up and coordination phase of a gear shift.

* * * * *